United States Patent
Beadle et al.

(10) Patent No.: US 6,336,213 B1
(45) Date of Patent: Jan. 1, 2002

(54) METHOD AND APPARATUS FOR DYNAMIC SELECTION OF WHICH BYTECODES SHOULD BE JUST IN TIME COMPILED

(75) Inventors: Bruce Anthony Beadle, Round Rock; Michael Wayne Brown, Georgetown; Michael Anthony Paolini; Douglas Scott Rothert, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,519

(22) Filed: Dec. 3, 1998

(51) Int. Cl.$^7$ .............................................. G06F 9/445
(52) U.S. Cl. ......................................................... 717/5
(58) Field of Search .............................................. 717/5

(56) References Cited

U.S. PATENT DOCUMENTS

| | | | | |
|---|---|---|---|---|
| 6,078,744 A | * | 6/2000 | Wolczko et al. ............ 395/705 |
| 6,092,120 A | * | 6/2000 | Swaminathan et al. ...... 709/247 |
| 6,093,216 A | * | 7/2000 | Adl-Tabatabai et al. ....... 717/3 |
| 6,118,940 A | * | 9/2000 | Alexander III et al. ..... 395/704 |
| 6,134,627 A | * | 10/2000 | Bak ............................... 711/6 |
| 6,151,703 A | * | 11/2000 | Crelier .......................... 717/5 |
| 6,158,048 A | * | 12/2000 | Lueh et al. .................... 717/9 |

* cited by examiner

Primary Examiner—Mark R. Powell
Assistant Examiner—Michael B. Holmes
(74) Attorney, Agent, or Firm—Duke W. Yee; Jeffrey S. LaBaw

(57) ABSTRACT

A method and apparatus in a data processing system for generating object code. A source code is received for compilation. A parameter is received, wherein the parameter indicates that a portion of the object code that is to be generated from a translation of the source code into an object code format only is to be interpreted. The source code is compiled into object code. An indication is created for the portion of the object code that only is to be interpreted.

37 Claims, 5 Drawing Sheets

FIG. 3A

300 — javac-neverJITthisClassFlag

FIG. 3B

302 — javac-neverJITthisMethodFlag:MethodName1, MethodName2

FIG. 3C

304 — javac-neverJITthese:@file,...

FIG. 3D

306 — javac-alwaysJITthisClassFlag

FIG. 3E

308 — javac-alwaysJITthisMethodFlag:MethodName1, MethodName2

FIG. 3F

310 — javac-alwaysJITthese:@file,...

| | | |
|---|---|---|
| CLASS/METHOD A | JIT | 402 |
| CLASS/METHOD B | NO JIT | 404 |
| CLASS/METHOD C | JIT | 406 |
| CLASS/METHOD D | NO JIT | 408 |
| CLASS/METHOD E | NO JIT | 410 |
| CLASS/METHOD F | JIT | 412 |

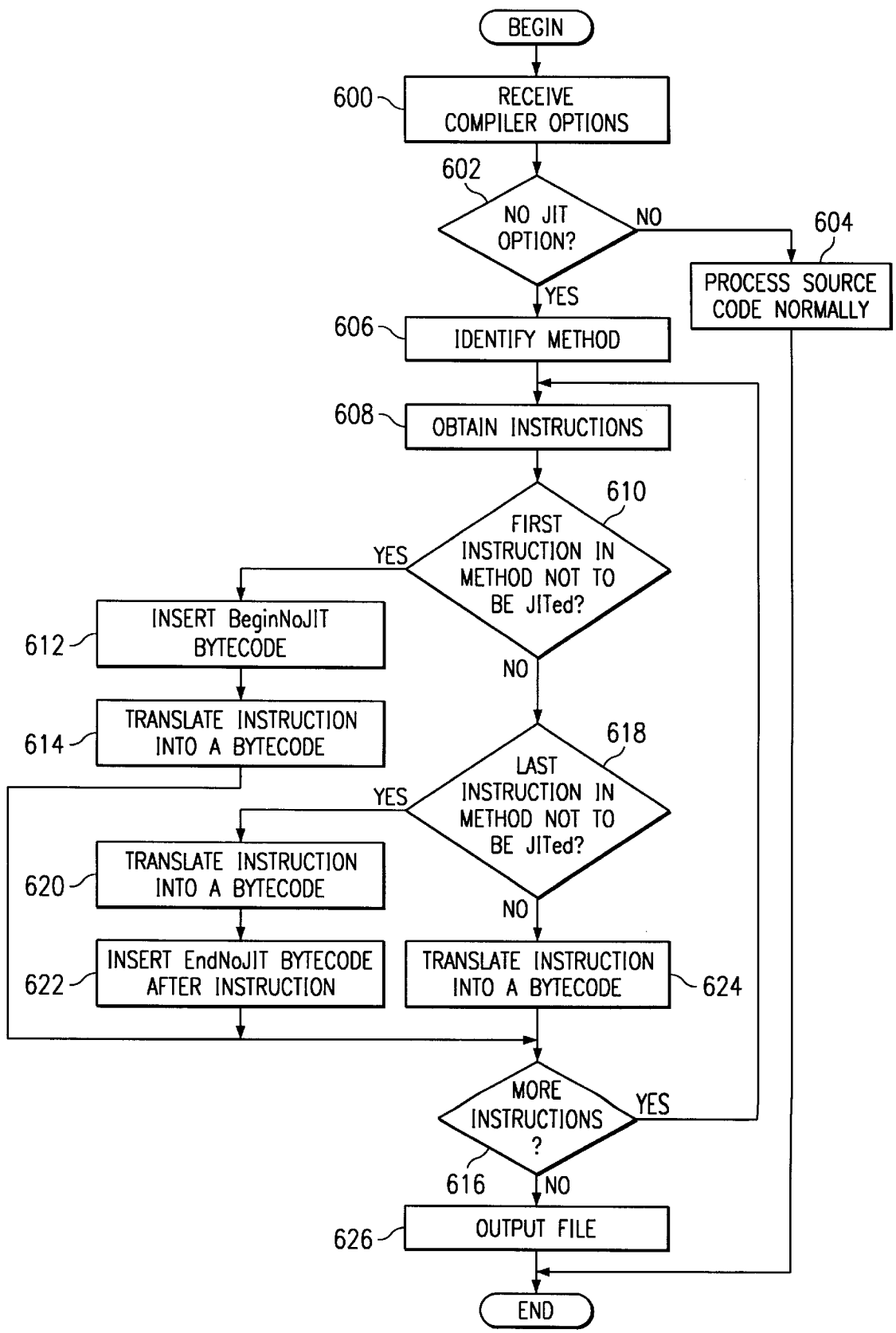

METHOD AND APPARATUS FOR DYNAMIC SELECTION OF WHICH BYTECODES SHOULD BE JUST IN TIME COMPILED

CROSS REFERENCE TO RELATED APPLICATIONS

The present invention is related to applications entitled A Method And Apparatus To Coordinate And Control The Simultaneous Use Of Multiple Just In Time Compilers With A Java Virtual Machine, Ser. No. 09/204,513, A Method And Apparatus To Selectively Control Processing Of A Method In A Java Virtual Machine, Ser. No. 09/204,512, Method And Apparatus For Automatic Service Of JIT Compiler Generated Errors, Ser. No. 09/204,511, Method And Apparatus For Dynamically Selecting Bytecodes For Just In Time Compiling In A User's Environment, Ser. No. 09/204,976, JIT/Compiler Java Language Extensions To Enable Field Performance and Serviceability, Ser. No. 09/204,968, A Method And Apparatus To Selectively Control Processing Of A Method In A Java Virtual Machine, Ser. No. 09/204,975, and Method And Apparatus For Dynamic Selection Of Instructions For Compiling Using Tags, Ser. No. 09/204,516, all of which are filed even date hereof, assigned to the same assignee, and incorporated herein by reference.

BACKGROUND OF THE INVENTION

1. Technical Field

The present invention relates generally to an improved data processing system and in particular to an improved method and apparatus for processing a method in a Java virtual machine. Still more particularly, the present invention relates to a method and apparatus for selectively controlling just in time compilation of a method.

2. Description of Related Art

Java is an object oriented programming language and environment, focusing on defining data as objects and the methods that may be applied to those objects. Java is designed to solve a number of problems in modern programming practice. Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run time system. The Java compiler generates bytecode instructions that are nonspecific to a particular computer architecture. A bytecode is a machine independent code generated by the Java compiler and executed by a Java interpreter. A Java interpreter is a module that alternately decodes and executes a bytecode. The decoding of the bytecode places the instruction into an executable form for the computer on which the code is to be executed. Then, the instruction is executed by the computer. These bytecode instructions are designed to be easy to interpret on any machine and easily translated on the fly into native machine code.

The Java virtual machine (JVM) is a virtual computer component that resides only in memory. A JVM includes components necessary to run a program on a computer, including an interpreter. The JVM allows Java programs to be executed on different platforms as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run time system. The Java compiler generates bytecode instructions that are nonspecific to a particular computer architecture. A bytecode is a machine independent code generated by the Java compiler and executed by a Java interpreter.

When extra speed in executing a Java program or applet is needed, a just in time (JIT) compiler may be used to translate bytecodes for a method or class into native machine instructions before executing them. Typically, this compilation only occurs once per method. Some JIT compilers may compile entire classes, rather than one method at a time.

In some situations, a JIT compiler may produce invalid results when compiling bytecodes from a given method of a class into instructions or machine code for execution on the computer. These errors do not occur if the code is not just in time compiled. Typically, these errors in execution of native instructions occur as a result of faulty logic in the JIT compiler. Currently, a mechanism for avoiding these errors is unavailable.

Therefore, it would be advantageous to have an improved method and apparatus for just in time compiling of methods.

SUMMARY OF THE INVENTION

The present invention provides a method and apparatus in a data processing system for generating object code. A source code is received for compilation. A parameter is received, wherein the parameter indicates that a portion of the object code that is to be generated from a translation of the source code into an object code format only is to be interpreted. The source code is compiled into object code. An indication is created for the portion of the object code that only is to be interpreted.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 3A–3F are examples of compiler options in accordance with a preferred embodiment of the present invention;

FIG. 4 is an example of a data structure containing class method information on which a class or method should not be just in time compiled in accordance with a preferred embodiment of the present invention;

FIG. 6 is a flowchart of a process used in a compiler to generate bytecodes in accordance with a preferred embodiment of the present invention;

DETAILED DESCRIPTION OF THE PREFERRED EMBODIMENT

Figure 1:
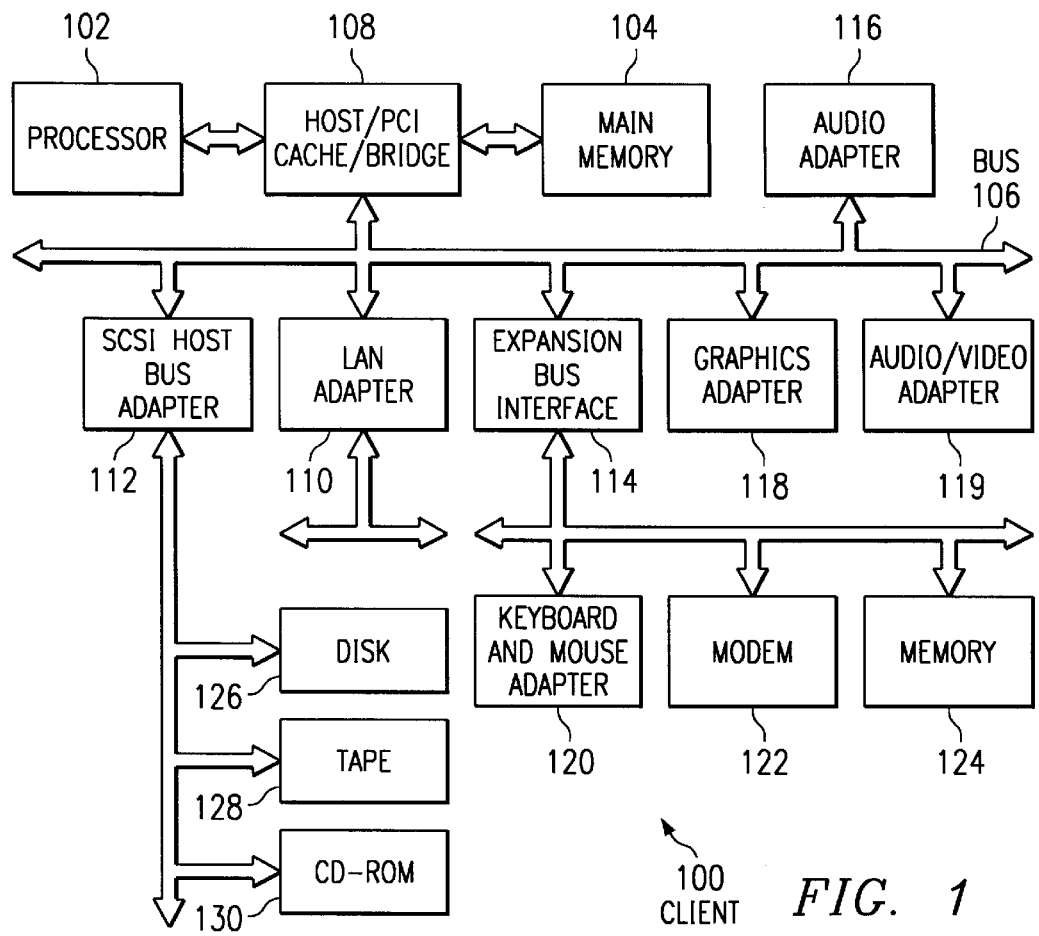
FIG. 1 is a block diagram of a data processing system in which the present invention may be implemented.

With reference now to FIG. 1, a block diagram of a data processing system in which the present invention may be implemented is illustrated. Data processing system 100 is an example of a client computer. Data processing system 100 employs a peripheral component interconnect (PCI) local bus architecture. Although the depicted example employs a PCI bus, other bus architectures such as Micro Channel and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, Small Computer System Interface (SCSI) host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130 in the depicted example. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 100. Instructions for the operating system, the object-oriented operating system, and applications or programs are located on storage devices, such as hard disk drive 126 and may be loaded into main memory 104 for execution by processor 102.

Those of ordinary skill in the art will appreciate that the hardware in FIG. 1 may vary depending on the implementation. For example, other peripheral devices, such as optical disk drives and the like may be used in addition to or in place of the hardware depicted in FIG. 1. The depicted example is not meant to imply architectural limitations with respect to the present invention. For example, the processes of the present invention may be applied to multiprocessor data processing system.

The present invention provides a method, apparatus, and instructions for selecting which methods are to be just in time compiled, also referred to as being "JITed". The present invention allows for selection of methods, classes, or selected bytecodes to be selectively just in time compiled. This mechanism is provided through compiler options added to a Java compiler. A programmer may set an option to define various classes, methods, or bytecodes that are not to be just in time compiled. In response to this option, the compiler may store information, which requests the class to not be just in time compiled using a number of mechanisms. For example, a unique Java bytecode may be defined to identify when a class or method is to be JITed. Additionally, a Java bytecode may be placed in any location at which bytecodes are not to be JITed with a second bytecode being placed at a second location indicating when bytecodes are again to be JITed. Alternatively, the information of whether to JIT COMPILE bytecodes may be stored in a data structure accessible by the JVM or through data placed within the class file itself.

Figure 2:
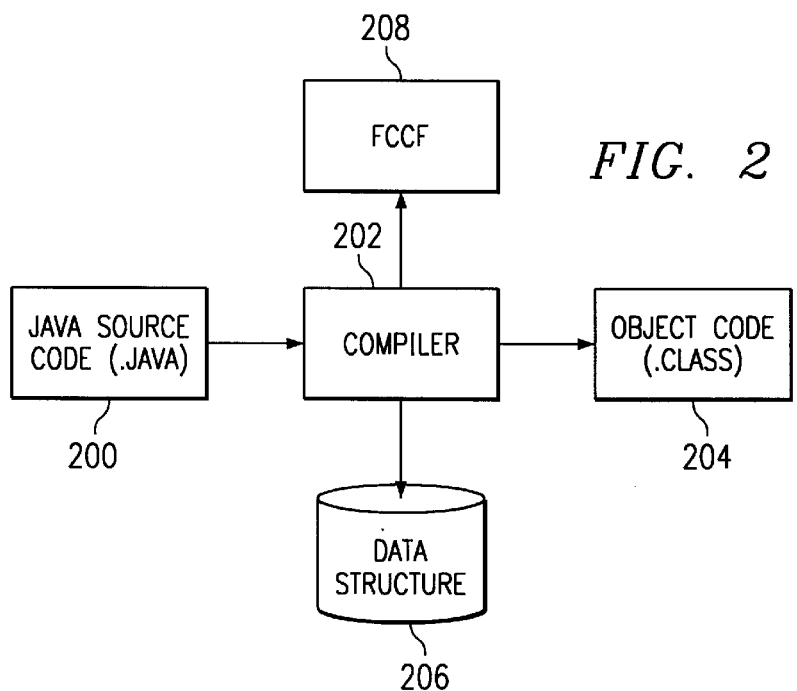
FIG. 2 is a diagram illustrating the generation of a Java application or applet in accordance with a preferred embodiment of the present invention.

Turning now to FIG. 2, a diagram illustrating the generation of a Java application or applet is depicted in accordance with a preferred embodiment of the present invention. Java source code 200 is presented to compiler 202 for processing. Source code is human readable program statements written in a high level or assembly language that are not directly readable by computer. A compiler is a program that transforms one set of symbols into another by filing a set of syntactic and semantic rules. In particular, a compiler translates all of the source code of a program written in a high level language to object code prior to execution of the program. Object code is generated by a compiler or assembler. In the depicted example, Java source code 200 is compiled by compiler 202 to generate object code 204. Object code 204 is at a bytecode level as opposed to a bitcode level. These bytecodes are designed for execution by a JVM as opposed to execution directly by the client, on which the code is to be executed. In this example, Java compiler 202 reads files with a ".java" extension. The source code in this file is converted into bytecodes, and with the result being saved in a file with a ".class" extension. In the depicted example, the command to cause compiler 202 to compile Java source code 200 may include a compiler option, which requests that a selected class or method not be just in time compiled at runtime.

Turning next to FIGS. 3A–3F, examples of compiler options are depicted in accordance with a preferred embodiment of the present invention. In FIG. 3A, compiler option 300 reads as follows; —neverJITthisClassFlag. Compiler option 300 indicates that the class Flag is never to be just in time compiled. In FIG. 3B, compiler option 302 reads as follows; —neverJITthisMethodFlag:MethodName1, MethodName2. In this example, the methods Name1 and Name2 within the class flag are not to be just in time compiled. In FIG. 3C, compiler option 304 reads as follows; —neverJITthese:@file, . . . Compiler option 304 indicates that any methods or classes identified in the file "file" is never to be just in time compiled. In FIG. 3D, compiler option 306 reads as follows—alwaysJITthisClassFlag and indicates that the class Flag should always be JITed. In FIG. 3E compiler option 308 reads as follows:—alwaysJITthisMethodFlag:MethodName1, MethodName2 and indicates that method Name1 and method Name2 within the class Flag should always be JITed. Next, option 310 in FIG. 3F reads as follows: —alwaysJITthese:@file, . . . and indicates that any methods or classes identified in the file named "file" should always be JITed. With respect to identification of files, wildcards may be used to select multiple files containing indications of methods in classes. For example, Unix regular expression, such as, @*.java may be used to select a number of files.

With reference back to FIG. 2, when a particular class or method is encountered that is not to be just in time compiled, compiler 202 may generate a unique bytecode placed in a first location to identify where just in time compiling is not to occur, and generate another unique bytecode that is placed in the location at which just in time compiling is again to begin. These bytecodes may be generated as normal bytecodes or created from Java source code 200. These bytecodes are output as object code 204 in a class file. Alternatively, instead of generating new bytecodes to indicate stop and start locations for just in time compiling, compiler 200 may store information as to which methods and classes are not to be just in time compiled in a data structure 206. This data structure may identify class methods and names that are not to be just in time compiled. Alternatively, data structure 200 may include opposite information to identify where just in time compiling is to stop and begin within the bytecodes for object code 204. Depending on the implementation, the bytecodes and the information indicating the bytecodes that are to remain unJITed may be placed in a fully caffeinated class file 208, which is designed to contain both the bytecodes and the information as to which bytecodes should not be JITed or should be JITed.

Turning now to FIG. 4, an example of a data structure containing class method information on which a class or method should not be just in time compiled is depicted in accordance with a preferred embodiment of the present invention. Data structure 400 includes a number of entries 402–412 in which each entry identifies a class/method and an indication as to whether the method is to be just in time compiled or not just in time compiled. Alternatively, data structure 400 may contain only identifications of those classes and methods that are not to be just in time compiled.

Figure 5:
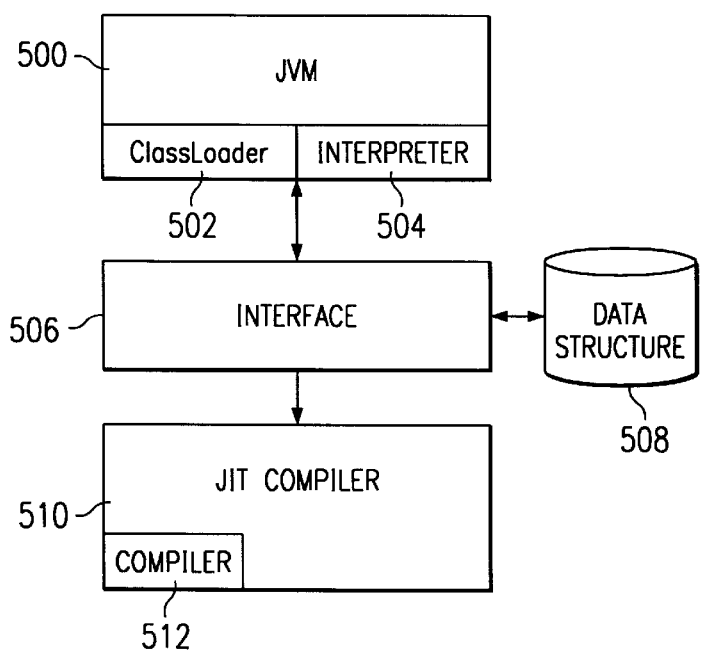
FIG. 5 is a diagram of components used to selectively process methods and classes in accordance with a preferred embodiment of the present invention.

With reference now to FIG. 5, a diagram of components used to selectively process methods and classes is depicted in accordance with a preferred embodiment of the present invention. In this example, JVM 500 includes a ClassLoader 502 and an interpreter 504. Interface 506 includes a mechanism for selecting which methods are not to be just in time compiled based on information located in data structure 508. The information in data structure 508 may contain information shown in data structure 400 in FIG. 4 to indicate which methods are not to be just in time compiled. Also shown in FIG. 5 is a JIT compiler 510, which includes a compiler unit 512. JVM 500 and JIT compiler 510 include other components, which are not shown to avoid obscuring the description of the present invention.

JVM 500 will start execution by invoking a method of a specified class. In the depicted example, this method may be, for example, main. The method may be passed a single argument in the form of an array of strings. This causes the specified class to be loaded, linked to other types that it uses, and initialized. The loading of a class involves finding the binary form of a class or interface type with a particular name. In the depicted example, the loading process is implemented by ClassLoader 502. ClassLoader 502, in this example, includes a ClassLoader class, which includes methods for loading new classes into the Java runtime environment. In the depicted example, interpreter 504 is a program that translates the bytecode to a native instruction and then executes the native instructions. The bytecode is translated into a form executable by the computer on which the JVM is located.

In accordance with a preferred embodiment of the present invention, JVM 500 may be enabled to recognize bytecodes generated by JIT compiler 510 that indicate which bytecode should not be just in time compiled. In such a case, JVM 500 must be enabled to recognize these new bytecodes. Alternatively, in the case that the information as to which classes or methods should not be just in time compiled are stored in a data structure, interface 506 may receive the call for the method destined for JIT compiler 510. Interface 506 receives or intercepts the method being passed to JIT compiler 510 in this example by registering itself as a JIT compiler that is to receive the method in place of JIT compiler 510. The method is then received from JVM 500 by interface 506 through a compile class application programming interface (API) invoked by interpreter 504 in JVM 500. Interface 506 takes the method information received from ClassLoader 502 and determines whether or not to JIT COMPILE a particular method. In this example, the determination is made by comparing the method name to a list or table method in data structure 508. If the method is to be just in time compiled, the method is then passed on to JIT compiler 510. Otherwise, interface 506 may place a call back to JVM 500 to have interpreter 504 interpret the method.

With reference now to FIG. 6, a flowchart of a process used in a compiler to generate bytecodes is depicted in accordance with a preferred embodiment of the present invention. The process in FIG. 6 is employed to generate bytecodes from Java source code. In this flowchart, the compiler generates bytecodes to indicate when just in time compiling is to stop and start. These bytecodes are placed within the bytecodes in a location just prior to and after the method to delineate the bytecodes that are not to be just in time compiled.

The process begins by receiving compiler options when the compiler is invoked (step 600). A determination is then made as to whether a no JIT option is present (step 602). If a no JIT option is absent, the source code is then processed normally (step 604) with the process terminating thereafter. If a no JIT option is present, the method or methods that are not to be JITed are identified (step 606). The process then obtains the first instruction for processing (step 608). A determination is made as to whether the instruction is the first instruction in a method that is not to be JITed (step 610). If this is the first instruction in a method not to be JITed, then a BeginNoJIT bytecode is inserted (step 612). Thereafter, the instruction is translated into a bytecode (step 614). Next, a determination is made as to whether additional instructions are present for processing (step 616). If additional instructions are present for processing, the process then returns to step 608 to obtain the next instruction.

With reference again to step 610, if the instruction is not the first instruction in a method not to be JITed, the process then determines whether the instruction is the last instruction in a method that is not to be JITed (step 618). If the instruction is the last instruction of a method not to be JITed, then the instruction is translated into a bytecode (step 620), and a EndNoJit bytecode is inserted after the instruction (step 622). Thereafter, the process proceeds to step 616 as described above. If in step 618, the instruction is not the last instruction of a method not to be JITed or to always to be JITed, the process then translates the instruction into a bytecode (step 624) with the process then proceeding to step 616 as described above. If no additional instructions are present for processing, a file is output with the bytecodes (step 626) with the process terminating thereafter. Alternatively, in FIG. 6 instead of inserting bytecodes into the class file and requiring a JVM to recognize BeginNoJIT and EndNoJIT bytecodes, offsets indicating the locations in a method that are not to be JITed is stored in a data structure. In such a case, instead of inserting a BeginNoJIT bytecode in step 612 and inserting a start bytecode in step 622, the process of the present invention in the compiler would store opposite information to be placed in a database. Another alternative is to store the opposite information with the class file in a fully caffienated class file.

The process in FIG. 6 was directed at identifying methods that should not be JITed. The process in FIG. 6 also may be applied to entire classes or code paths within a method. Further, in the instance that a method is to be always JITed, the process in FIG. 6 may be used to make such an indication to a JVM. For example, instead of inserting a BeginNoJIT bytecode in step 612, a BeginAlwaysJIT bytecode would be inserted prior to the bytecode generated for the first instruction in the method. With respect to insertion of an EndNoJIT bytecode in step 622, an EndAlwaysJIT bytecode would be inserted after the last instruction of the method. In this manner, methods, classes, or code paths may be selected to always be JITed.

Figure 7:
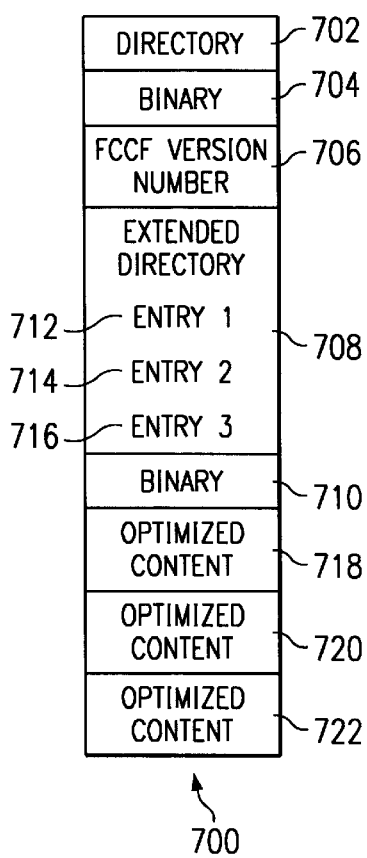
FIG. 7 is a diagram of a fully caffeinated class file (FCCF) and the processing of a FCCF in accordance with a preferred embodiment of the present invention.

With reference now to FIG. 7, a diagram of a fully caffienated class file (FCCF) and the processing of a FCCF is depicted in accordance with a preferred embodiment of the present invention. FCCF 700 includes a directory 702 and binary 704, which are normally found in a standard Java class file. In addition, a FCCF version number 706, an extended directory 708, and binary 710 are found in FCCF 700.

Directory 702 and binary 704 are standard Java class file entries. Binary 704 is a binary stream of data containing class file data including bytecodes. A JVM that is unable to recognize additional FCCF information will ignore FCCF version number 706, extended directory 708, and binary 710. A standard JVM will be able to read the content within binary 704 using directory 702 and process FCCF 700 as a regular Java class file.

On the other hand, a JVM that is able to process these additional sections will process extended directory 708 to gain entry to binary 710, which is a binary stream of data that contains optimized content. This optimized content includes offsets identifying portions of bytecodes that are not to be just in time compiled. In the depicted example, an extended directory 708, also referred to as a table of contents, includes a number of entries.

Extended directory 708 includes entry 1 712, entry 2 714, and entry 3 716. These entries point to optimized content 718, optimized content 720, and optimized content 722, respectively within binary 710.

FCCF's are example of data structures that may be used in providing customized content to clients. Other types of data structures may be used to deliver optimized content.

More information on FCCFs and their use may be found in Method and Apparatus For Optimizing Execution of Java Programs, attorney docket no. AT9-98-225, Ser. No. 09/126,282, filed Aug. 30, 1998, and in Method and Apparatus For Loading Native Object Code in Data Processing System, attorney docket no. AT9-98-224, Ser. No. 09/126,283, filed Aug. 30, 1998, both assigned to the same assignee and both incorporated herein by reference.

Figure 8:
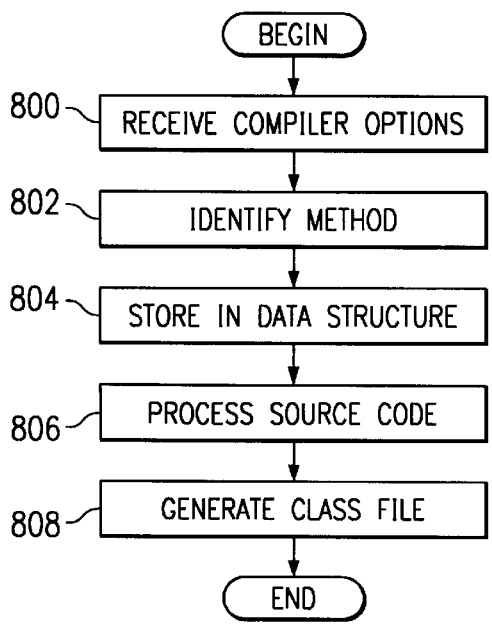
FIG. 8 is a flowchart for a process for compiling source code with no JIT options in accordance with a preferred embodiment of the present invention.

With reference now to FIG. 8, a flowchart for a process for compiling source code with no JIT COMPILE options is depicted in accordance with a preferred embodiment of the present invention. The process begins by receiving compiler options (step 800). This process is used when a compiler option is received with a no JIT compile option. Thereafter, the method is identified from the compiler option (step 802). The identity of the method is stored in a data structure, such as data structure 206 in FIG. 2 (step 804). Thereafter, the source code is processed to create object code in the form of bytecodes (step 806). The bytecodes are then used to generate a class file (step 808) with the process terminating thereafter. The processing in step 802 may be used to identify one or more methods in a class that is being compiled. Alternatively, step 802 may be altered to identify entire classes that are to remain un-JITed.

Figure 9:
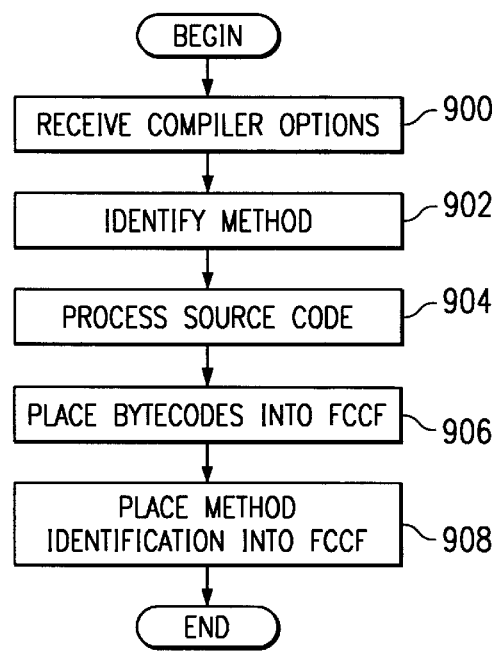
FIG. 9 is a flowchart of a process for compiling source code with a no JIT compile option and generating an FCCF in accordance with a preferred embodiment of the present invention.

Turning now to FIG. 9, a flowchart of a process for compiling source code with a no JIT option and generating an FCCF is depicted in accordance with a preferred embodiment of the present invention. The process begins by receiving compiler options (step 900). From the compiler option, the name of one or more methods is identified (step 902). These methods are the ones that are to remain un-JITed. Thereafter, the source code is processed to generate bytecodes (step 904). These bytecodes are then placed into an FCCF (step 906). Thereafter, the identification of one or more methods are placed into the FCCF as optimized content (step 908) with the process terminating thereafter.

Although the flowcharts are directed towards processing methods, these processes of the present invention also may be applied to processing one or more classes.

Figure 10:
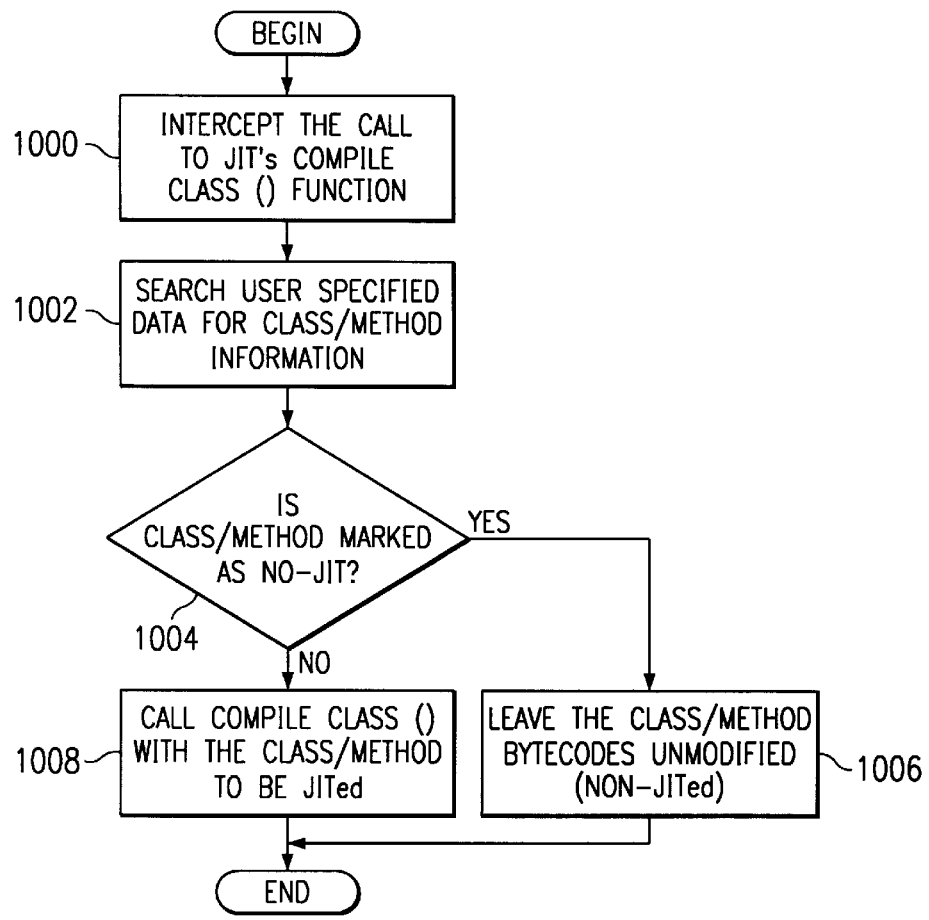
FIG. 10 is a flowchart of a process used to determine whether a method should be just in time compiled in accordance with a preferred embodiment of the present invention.

With reference now to FIG. 10, a flowchart of a process used to determine whether a method should be just in time compiled is depicted in accordance with a preferred embodiment of the present invention. The process begins by intercepting a call to the JIT compiler's compile class function (step 1000). Thereafter, a search is made for user specified data for a particular class/method (step 1002). This search may be made in a data structure containing a list of classes or methods that are not to be just in time compiled. A determination is then made as to whether the class/method has been marked as no JIT (step 1004). This determination is made by comparing the method to be JITed to data within a data structure, such as data structure 400 in FIG. 4. If the class/method is not to be JITed, then the class/method bytecodes are unmodified (step 1006) with the process terminating thereafter. These bytecodes may then be sent to the interpreter for execution. Otherwise, the class/method to be JITed is sent to the JIT compiler by calling compile class (step 1008) with the process terminating thereafter.

Figure 11:
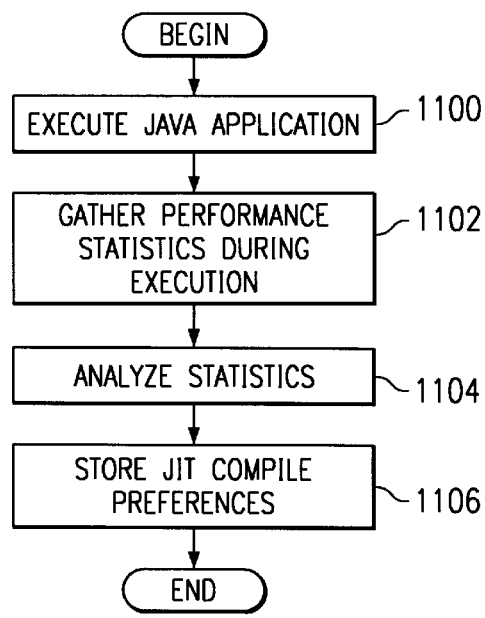
FIG. 11 is a flowchart of a process used to analyze a Java application in accordance with a preferred embodiment of the present invention.

With reference now to FIG. 11, a flowchart of a process used to analyze a Java application is depicted in accordance with a preferred embodiment of the present invention. This process is used to analyze a Java application or applet to predefine JIT compile preferences based on the analysis. This information may be supplied to a user along with the Java application or downloaded by the user at a later time. In this manner, fixes to errors in JIT compiling classes/methods may be provided to a user without having to alter the class/method or alter the JIT compiler. In addition, users may be supplied optimizations, such as selections of optimal JIT compilers and/or JIT compile options.

The process begins by executing the Java application (step 1100). Thereafter, performance statistics during execution of the Java application are gathered (step 1102). These statistics may include, for example, footprint size of the JIT compiled code, speed of execution of the JIT compiled code, a presence or absence of errors in executing the JIT compiled code, and the amount of time required to JIT compile a class or method. These statistics are analyzed against various performance criteria (step 1104). Based on the analysis, determinations may be made as to whether a class or method shall be JIT compiled along with various optimization preferences. These results are stored as JIT compile preferences in a data structure (step 1106), such as data structure 400 in FIG. 4 with the process terminating thereafter.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted embodiment is directed towards processing bytecodes in Java, the processes of the present invention may be applied to other programming languages and environments that process instructions, which are non-specificto a computer on which the instructions are to be executed. In such a case, a virtual machine on the computer may interpret the instructions or send the instructions to a compiler to generate code suitable for execution by the computer on which the virtual machine is located.

The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for generating object code, the method comprising the data processing system implemented step of:

receiving source code for compilation;

receiving a parameter, wherein the parameter indicates a portion of the object code that is to be generated from a translation of the source code into an object code format only is to be interpreted;

compiling the source code into the object code; and creating an indication of the portion of the object code that is only to be interpreted.

2. The method of claim 1, wherein the object code is a plurality of bytecodes.

3. The method of claim 2, wherein the indication is a first bytecode delineating a first location in the plurality of bytecodes at which just in time compilation is to begin and a second bytecode delineating a second location in the plurality of bytecodes at which just in time compilation is to end.

4. The method of claim 3, wherein the first bytecode is located at the first location and wherein the second bytecode is located at the second locations.

5. The method of claim 2, wherein the indication is stored in a table used by a virtual machine to identify bytecodes that are to be just in time compiled.

6. The method of claim 5, wherein the indication includes a first offset within the plurality of bytecodes to indicate a first location at which just in time compilation is to begin and a second offset to indicate a second location in the plurality of bytecodes at which just in time compilation is to end.

7. The method of claim 2 further comprising:

placing the bytecodes into a class file; and placing the indication of a portion of the bytecodes that are only to be interpreted into the class file.

8. The method of claim 7, wherein the file is a fully caffeinated class file.

9. A method in a computer system for generating bytecodes, the method comprising the computer implemented steps of:

receiving Java source code for compilation into a plurality of bytecodes;

receiving a compile option, wherein the compile option identifies a portion of the plurality of bytecodes for which just in time compiling is to be prevented;

compiling the Java source code into the plurality of bytecodes using the compile option; and creating an indication for a portion of the bytecodes, wherein the indication is used during execution of the plurality of bytecodes to prevent just in time compilation of the portion of the bytecodes.

10. The method of claim 9, wherein the compile option includes a name of a method for which just in time compilation is to be prevented.

11. The method of claim 9, wherein the compile option includes a name of a class for which just in time compilation is to be prevented.

12. The method of claim 9, wherein the plurality of bytecodes includes a method and wherein the indication is an identification of the method.

13. The method of claim 9, wherein the plurality of bytecodes includes a method and wherein the indication is a set of offsets for a beginning of the method and an end of the method.

14. The method of claim 9, wherein the indication includes a first bytecode and a second bytecode, wherein the first bytecode indicates where just in time compiling is to end and the second bytecode indicates when just in time compiling is to begin and further comprising:

placing the first bytecode just prior to the portion of the bytecodes; and placing the second bytecode just after the portion of the bytecodes.

15. The method of claim 9 further comprising:

creating a class file for the plurality of bytecodes.

16. The method of claim 15 further comprising:

storing the indication in a data structure, wherein the data structure is accessible during execution of the plurality of bytecodes.

17. The method of claim 15, wherein the class file is a fully caffeinated class file and wherein the indication is stored as optimized content in the fully caffeinated class file.

18. The method of claim 9, further comprising:

receiving a second compile option, wherein the second compile option identifies a second portion of the plurality of bytecodes for which just in time compiling is to always occur;

creating a second indication for the second portion of the bytecodes, wherein the second indication is used during execution of the plurality of bytecodes to cause just in time compilation of the second portion of the bytecodes.

19. A method in a computer system for generating bytecodes, the method comprising the computer implemented steps of:
   receiving Java source code for compilation into a plurality of bytecodes;
   receiving a compile option, wherein the compile option identifies a portion of the plurality of bytecodes for which just in time compiling is to always occur;
   compiling the Java source code into the plurality of bytecodes; and
   creating an indication for the portion of the bytecodes, wherein the indication is used during execution of the plurality of bytecodes to always cause just in time compilation of the portion of the bytecodes.

20. A data processing system for generating object bytecode, the data processing system comprising:
   first receiving means for receiving source code for compilation;
   second receiving means for receiving a parameter, wherein the parameter indicates a portion of the object code that is to be generated from a translation of the source code into an object code format only is to be interpreted;
   compiling means for compiling the source code into the object code; and
   creating means for creating an indication that the portion of the object code are only to be interpreted.

21. The data processing system of claim 20, wherein the object code is a plurality of bytecodes.

22. The data processing system of claim 21, wherein the indication is a first bytecode delineating a first location in the plurality of bytecodes at which just in time compilation is to begin and a second bytecode delineating a second location in the plurality of bytecodes at which just in time compilation is to end.

23. The data processing system of claim 22, wherein the first bytecode is located at the first location and wherein the second bytecode is located at the second location.

24. The data processing system of claim 21, wherein the indication is stored in a table used by a virtual machine to identify bytecodes that are to be just in time compiled.

25. The data processing system of claim 24, wherein the indication includes a first offset within the plurality of bytecodes to indicate a first location at which just in time compilation is to begin and a second offset to indicated a second location in the plurality of bytecodes at which just in time compilation is to end.

26. The data processing system of claim 21 further comprising:
   first placing means for placing the bytecodes into a class file; and
   second placing means for placing the indication of a portion of the bytecodes that are only to be interpreted into the class file.

27. The data processing system of claim 26, wherein the file is a fully caffeinated class file.

28. A data processing system in a computer system for generating bytecodes, the data processing system comprising:
   first receiving means for receiving Java source code for compilation into a plurality of bytecodes;
   second receiving means for receiving a compile option, wherein the compile option identifies a portion of the plurality of bytecodes for which just in time compiling is to be prevented;
   compiling means for compiling the Java source code into the plurality of bytecodes; and
   creating means for creating an indication for a portion of the bytecodes, wherein the indication is used during execution of the plurality of bytecodes to prevent just in time compilation of the portion of the bytecodes.

29. The data processing system of claim 28, wherein the compile option includes a name of a method for which just in time compilation is to be prevented.

30. The data processing system of claim 28, wherein the plurality of bytecodes includes a method and wherein the indication is an identification of the method.

31. The data processing system of claim 28, wherein the plurality of bytecodes includes a method and wherein the indication is a set of offsets for a beginning of the method and an end of the method.

32. The data processing system of claim 28, wherein the indication includes a stop bytecode and a begin bytecode and further comprising:
   first placing means for placing the stop bytecode just prior to the portion of the bytecodes; and
   second placing means for placing the start bytecode just after the portion of the bytecodes.

33. The data processing system of claim 28 further comprising:
   creating means for creating a class file for the plurality of bytecodes.

34. The data processing system of claim 33 further comprising:
   storing means for storing the indication in a data structure, wherein the data structure is accessible during execution of the plurality of bytecodes.

35. The data processing system of claim 33, wherein the class file is a fully caffeinated class file and wherein the indication is stored as optimized content in the fully caffeinated class file.

36. A computer program product in a computer readable medium for generating object code, the computer program product comprising:
   first instructions for receiving source code for compilation;
   second instructions for receiving a parameter, wherein the parameter indicates a portion of the object code that is to be generated from a translation of the source code into an object code format only is to be interpreted;
   third instructions for compiling the source code into the object code; and
   fourth instructions for creating an indication that the portion of the object code is only to be interpreted.

37. A computer program product in a computer readable medium for generating bytecodes, the computer program product comprising:
   first instructions for receiving Java source code for compilation into a plurality of bytecodes;
   second instructions for receiving a compile option, wherein the compile option identifies a portion of the plurality of bytecodes for which just in time compiling is to be prevented;
   third instructions for compiling the Java source code into the plurality of bytecodes; and
   fourth instructions for creating an indication for a portion of the bytecodes, wherein the indication is used during execution of the plurality of bytecodes to prevent just in time compilation of the portion of the bytecodes.

* * * * *

UNITED STATES PATENT AND TRADEMARK OFFICE
CERTIFICATE OF CORRECTION

PATENT NO. : 6,336,213 B1
DATED : January 1, 2002
INVENTOR(S) : Beadle et al.

It is certified that error appears in the above-identified patent and that said Letters Patent is hereby corrected as shown below:

<u>Column 9,</u>
Line 63, after "second", please delete "locations" and insert -- location --.

Signed and Sealed this

Sixteenth Day of April, 2002

Attest:

JAMES E. ROGAN
*Director of the United States Patent and Trademark Office*

*Attesting Officer*